United States Patent [19]

Stadnick et al.

[11] 4,189,527

[45] Feb. 19, 1980

[54] SPHERICAL HEAT PIPE METAL-HYDROGEN CELL

[75] Inventors: Steven J. Stadnick, Redondo Beach; Howard H. Rogers, Culver City, both of Calif.

[73] Assignee: The United States of America as represented by the Secretary of the Air Force, Washington, D.C.

[21] Appl. No.: 4,244

[22] Filed: Jan. 17, 1979

[51] Int. Cl.[2] .......................................... H01M 12/06
[52] U.S. Cl. ...................................... 429/26; 429/27; 429/101; 429/120
[58] Field of Search ............... 429/26, 27, 101, 120; 165/32, 58, 132, 177

[56] References Cited

U.S. PATENT DOCUMENTS

| 3,461,954 | 8/1969 | Banks et al. | 429/120 X |
| 3,525,386 | 8/1970 | Grover | 429/26 X |
| 3,834,944 | 9/1974 | Dennison | 429/26 |
| 3,850,694 | 11/1974 | Dunlop et al. | 429/27 X |
| 3,867,199 | 2/1975 | Dunlop et al. | 429/101 |
| 3,904,436 | 9/1975 | Cercone et al. | 429/120 X |

*Primary Examiner*—Anthony Skapars
*Attorney, Agent, or Firm*—Joseph E. Rusz; Arsen Tashjian

[57] ABSTRACT

A metal-hydrogen cell (e.g., silver-hydrogen or nickel-hydrogen) of heat pipe design wherein a central heat pipe serves as a thermal path, a positive plate conductor and terminal, and a mechanical support for the stack. The positive plates are electrically, mechanically and thermally connected to the heat pipe in the stack center. The negative plate terminals are at the outside edge of the stack. The pressure vessel may be of spherical configuration to provide a light weight design which has a two to one stress advantage in hoop stress over a cylinder with the same wall thickness and internal pressure.

5 Claims, 1 Drawing Figure

TO
THERMAL RADIATOR

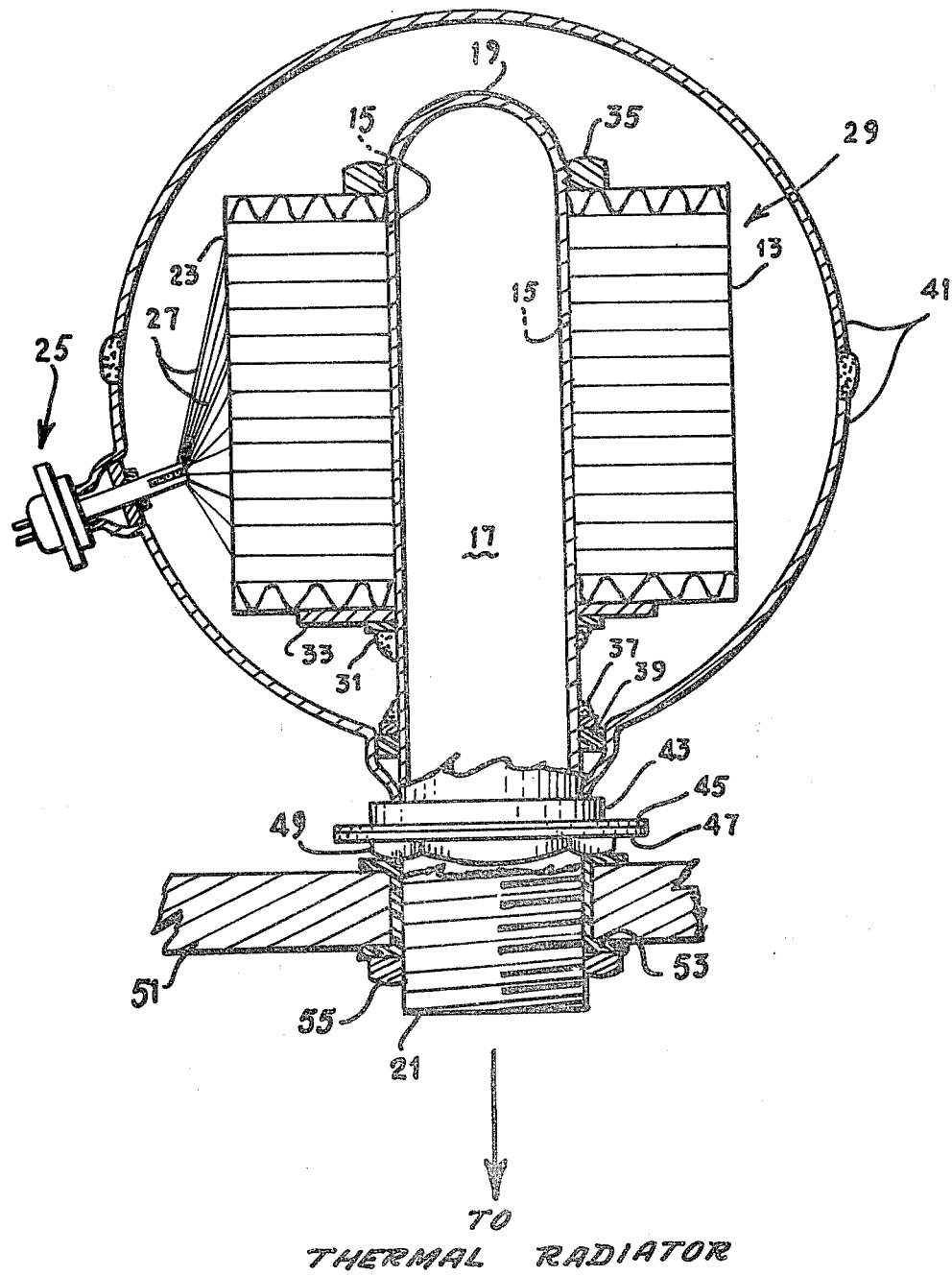

SPHERICAL HEAT PIPE METAL-HYDROGEN CELL

STATEMENT OF GOVERNMENT INTEREST

The invention described herein may be manufactured and used by or for the government for governmental purposes without the payment of any royalty thereon.

BACKGROUND OF THE INVENTION

This invention relates to an improved metal-hydrogen cell and, more particularly, the invention is concerned with providing a central heat pipe which serves as the positive plate conductor and terminal and the mechanical support for the stack as well as the thermal path for controlling the heat generated by the cell.

Heretofore, it has been common practice to provide a structural arrangement where the primary heat flow in the metal-hydrogen cell is from the outside edge of the cell stacks to the pressure vessel. In order to provide a thermal path, a minimum gap would be required placing the cell wall very close to the plate edges. Because of the close proximity of the cell wall and the plate edges, such occurrences as vibration and temperature or pressure variations within the cell can cause the outer edge of the cell stack to make contact with the cell wall. This can cause shorts in the cell stack. Also, damage in the form of bending of the substrate wires, chipping of active material and local destruction of the separator can occur when the battery is subjected to impact with the pressure vessel during launch when the cell is installed in a space vehicle or the like.

Thus, it would be desirable to provide a cell which would incorporate all of the advantages of the cylindrical cell without the obvious drawbacks noted above. The hereinafter described spherical heat pipe cell does overcome all of the disadvantages of the cylindrical cell and still allows substantial weight reduction with no loss of strength and reliability.

SUMMARY OF THE INVENTION

The present invention is concerned with providing a spherical heat pipe cell having superior thermal control by using the heat pipe as a direct connection from the center of each positive plate to the thermal radiator. The heat pipe design allows the heat pipe to serve three functions, namely, the thermal path, the positive plate conductor and terminal, and the mechanical support of the stack. This combination of functions results in a significant weight savings.

Accordingly, it is an object of the invention to provide a spherical heat pipe cell suitable for use in a metal-hydrogen battery wherein the heat pipe serves to directly connect the center of each positive plate to the thermal radiator thereby providing superior thermal control.

Another object of the invention is to provide a heat pipe cell having no constraint on the shape of the pressure vessel. Since the primary heat flow is not between the outside edge of the cell stacks and the pressure vessel, there is no minimum gap required to provide the thermal gap.

Still another object of the invention is to provide a heat pipe cell wherein the shape of the pressure vessel is a sphere thereby resulting in a weight saving of 30% over a comparable metal-hydrogen pressure vessel of cylindrical configuration. The spherical shape has a two to one stress advantage in hoop stress over a cylinder with the same diameter, wall thickness, and internal pressure.

A further object of the invention is to provide a spherical heat pipe cell having no constraint on case expansion and contraction by the stack support system. There is no constraint on the growth or size of the outside diameter of the electrodes, thereby avoiding cell failure due to radial electrode growth stemming from cell operation.

A still further object of the invention is to provide a spherical heat pipe cell having much improved resistance to shorts at the outer edges of the cell stack. Since the cell wall is not adjacent to the plate edges, there is no contact damage due to impact with the pressure vessel during launch when the battery is installed in a space vehicle or the like.

These and other objects, features and advantages will become more apparent after considering the following detailed description taken in conjunction with the annexed drawing and appended claims.

BRIEF DESCRIPTION OF THE DRAWING

The drawing FIGURE is a view in cross-section elevation of a spherical heat pipe cell according to the invention showing details of the cell stack and the positive and negative terminal connections.

DESCRIPTION OF A PREFERRED EMBODIMENT

While the below description is directed to a particular nickel-hydrogen cell, it is to be understood that the inventive design is as applicable to any metal-hydrogen cell, e.g., a silver-hydrogen cell.

Referring now to the drawing, there is shown a spherical heat pipe cell designed for use with a nickel-hydrogen cell of the type shown and described in U.S. Pat. No. 3,867,199 granted to James D. Dunlop et al wherein a nickel-hydrogen cell stack is disposed in a conventional heavy pressure vessel without a heat pipe. In the improved spherical heat pipe cell hereinafter disclosed, there is a plurality of positive electrodes 13 in the form of flat porous sintered metal plaques, such as of nickel or silver. Each positive electrode includes a central opening 15 through which a heat pipe 17 passes. Negative electrodes and separators (not shown) are positioned between each of the positive electrodes 13. The central heat pipe 17 which passes through the cell stack is sealed at the upper end 19 and open at the lower end 21 which is operatively connected to a thermal radiator (not shown) for providing thermal control of the cell stack. Each of the positive electrodes 13 is electrically connected to the heat pipe 17 at the central openings 15 so that the heat pipe 17 becomes the positive plate conductor and terminal. The heat pipe 17 also serves as the mechanical support for the stack of positive electrodes 13.

The plate terminals 23 for the negatives are at the outside edge of the stack and are electrically connected to the negative terminal 25 by means of the leads 27. The cell stack 29 which includes the positive plates 13 are depicted, by way of example, in a pineapple slice back-to-back positive sequence. It is to be understood that such a sequence is not critical in carrying out the concept of the present invention. For example, the invention is equally useful in a recirculating stack design. An upper flange 31 is welded onto the heat pipe 17 for supporting the stack 29 and a Belleville washer 33 is positioned around the heat pipe 17 between the flange 31 and the stack 29. A nut 35 threaded on the upper end of the pipe 17 serves to compress the Belleville washer 33 and keep the stack 29 in position on the pipe 17. A lower flange 37 is welded to the lower portion of the heat pipe 17. An alumina insulator 39 is positioned directly under the lower flange 37 and serves to prevent the heat pipe 17 from making direct contact with the pressure vessel 41. A second alumina insulator 43 is positioned directly under the lower open end of the spherical pressure vessel 41 to prevent contact with a Belleville washer 45 which is directly thereunder. A positive terminal seal 47 is positioned between the positive terminal 49 and the Belleville washer 45. The entire assembly is attached to a mounting shelf 51 which is prevented from making contact with the heat pipe 17 by means of plastic insulation 53. A nut 55 tightened around the threaded lower end 21 of the pipe 17 serves to attach the entire assembly to the mounting shelf 51.

The positive electrodes 13 which are electrically, mechanically and thermally connected to the heat pipe 17 in the center of the stack 29 may be attached in any of several ways. One convenient means for attaching the positives 13 to the pipe 17 is the incorporation of a metal washer which appears as part of a truncated cone with the inner diameter the size of the heat pipe 17 and the width 0.1 inch. These washers are placed between the pairs of positive plates 13 and when the stack preload is applied, the ring provides a thermal and electrical path to the heat pipe 17. In a preferred embodiment of the heat pipe cell, the heat pipe is 1¼ inch in diameter.

Although the invention has been illustrated in the accompanying drawing and described in the foregoing specification in terms of a preferred embodiment thereof, the embodiment is not limited to this embodiment. It will be apparent to those skilled in the art that the hereinbefore described spherical heat pipe cell can be used with cells other than the nickel-hydrogen and silver-hydrogen type and that certain changes, modifications and substitituions can be made therein, particularly with regard to the construction details without departing from the true spirit and scope of the appended claims.

Having thus set forth the nature of our invention, what we claim and desire to secure by Letters Patent of the United States is:

1. A metal-hydrogen cell having superior thermal control and minimum weight to strength ratio, said battery comprising a spherical pressure vessel having an open lower portion, a central heat pipe vertically disposed in said pressure vessel and electrically isolated therefrom, said heat pipe being fixedly positioned in said pressure vessel and including a threaded lower portion extending downward through the opening in said pressure vessel, a stack of positive and negative electrodes positioned in said pressure vessel around said central heat pipe, said positive plates being electrically, mechanically and thermally connected to the outer wall of said heat pipe, said negative electrodes having terminals at the outer edge of said stack connected to a negative terminal extending through the wall of said pressure vessel, and a nut threaded attached to the lower end of said heat pipe to operate as the positive terminal of the cell.

2. The metal-hydrogen cell defined in claim 1 wherein said pressure vessel includes mounting means comprising a shelf having a hole therein, the lower end of said heat pipe extending downward through the hole in said shelf, insulating means to prevent contact between said shelf and said heat pipe and a nut tightened on said heat pipe to hold said pressure vessel to said shelf.

3. The metal-hydrogen cell defined in claim 1 wherein said central heat pipe includes a closed top of hemispherical configuration and an open lower end in operative communication with a thermal radiator.

4. The metal-hydrogen cell according to claim 3 in which the metal consists of nickel.

5. The metal-hydrogen cell according to claim 3 in which the metal consists of silver.

* * * * *